United States Patent Office 2,718,491
Patented Sept. 20, 1955

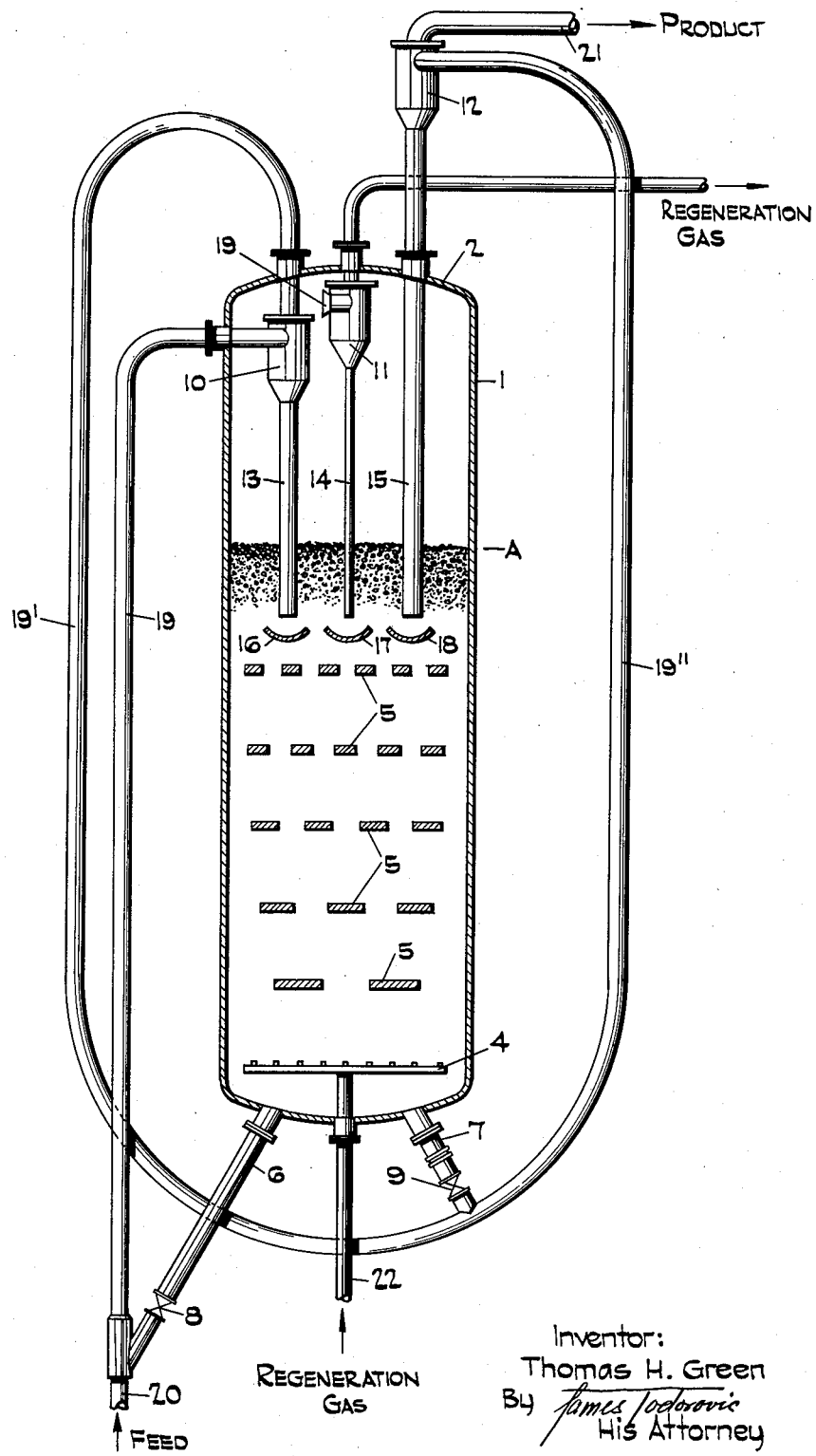

2,718,491

CATALYTIC CONVERSION OF HYDROCARBON OIL AND APPARATUS THEREFOR

Thomas H. Green, White Plains, N. Y., assignor to Shell Development Company, Emeryville, Calif., a corporation of Delaware Application June 12, 1953, Serial No. 361,173

4 Claims. (Cl. 196—49)

This invention relates to the conversion of hydrocarbon oils with finely divided catalysts and apparatus therefor. More particularly, the invention relates to a process and apparatus for effecting various hydrocarbon conversions at elevated temperatures with finely divided catalysts wherein the conversion is carried out while passing the oil vapors and suspended catalyst through a long tubular reactor and the catalyst is replaced by freshly regenerated catalyst enroute whereby the contact time of the catalyst with the oil vapor is materially less than the contact time of the oil vapor with the catalyst.

The application of powdered catalysts for the conversion of hydrocarbon oils using the fluidized catalyst technique is well known and finds its widest application in the field of catalytic cracking and reforming. In the processes heretofore used, the hydrocarbon oil is contacted with the catalyst while the latter is in the so-called fluidized or pseudo liquid state, and a stream of the partially spent catalyst is continuously transported from the reaction zone to a separate regeneration zone wherein it is regenerated while also in the fluidized state. The regenerated catalyst is then cycled back to the reaction zone, thereby creating a catalyst circulation.

During use in various vapor phase hydrocarbon conversion processes at elevated temperatures the catalyst invariably becomes contaminated with carbonaceous deposits, loosely referred to as coke, which are produced by secondary polymerization, condensation, and dehydrogenation reactions. These deposits form quite quickly on the catalyst surface thereby reducing the activity of the catalyst. If, in a given hydrocarbon conversion, the rate of coke deposition on the catalyst is determined at different residence times of the catalyst with the oil vapors, it is found that the initial rate of coke deposition is very high and then gradually declines with time. On the basis of this it has been the belief, heretofore, that a relatively long residence time, e. g., at least a few minutes, of the catalyst in the conversion zone is desirable. However, the activity of the catalyst also declines during the contact, and hence the conversion per unit time. Contrary to the general belief it is advantageous to contact the catalyst with the oil vapors for only a very short time between regenerations. This is, however, not possible in the systems heretofore used, firstly, because of the nature of the systems and secondly, because an appreciable contact of the oil with the catalyst is required to obtain the desired degree of conversion.

The contact time of the oil vapors with the catalyst is essentially dependent upon the time required for the vapors to pass up through the fluidized bed of catalysts and is, therefore, a function of the superficial gas velocity and the depth of the bed of catalysts. It is in all cases relatively short, e. g., a few seconds at most.

The contact time of the catalyst with the oil vapors, on the other hand, depends upon the hold-up of catalyst in the reaction zone and upon the rate of catalyst circulation. The rate of catalyst circulation, at any given hydrocarbon feed rate, is in turn, dependent upon the catalyst-to-oil ratio. In normal operations heretofore the contact time of the catalyst in the reaction zone has been much longer than the contact time or residence time of the hydrocarbon vapors in the reaction zone, e. g., several minutes. Even with a minimum catalyst hold-up and a high catalyst-to-oil ratio, the residence time of the catalyst in the reaction zone is much greater than that of the hydrocarbon vapors. In a tubular reactor the residence time of the catalyst is greater than that of the vapors due to slippage, and this is particularly the case when the tubular reactor is not perfectly straight and vertical. In a downflow tubular reactor, it might be possible to have both residence times the same, or, due to the effect of gravity on the catalyst, even to have the catalyst residence time slightly shorter, but the difference would be slight at most. Also, such a system would be beset with numerous drawbacks.

In the system of operation and apparatus of my invention, the residence time of the catalyst in the reaction zone is considerably less than that of the oil vapors. In this system, although the residence time of the oil in the conversion zone is relatively short, good conversions are obtained through utilization only of the high initial activity of the catalyst. This has several advantages as will be evident from the following description of the process.

The accompanying drawing illustrates semi-diagrammatically a suitable and preferred arrangement of apparatus, i. e., the vessels and important lines, in which the invention may be practiced. The apparatus illustrated comprises a vertically disposed cylindrical regenerator vessel 1, having top and bottom closures, and provided with a gas distributing means 4 near the bottom for the introduction and distribution of regeneration gas. The regeneration vessel is preferably provided with one or more spaced grid beams 5 or perforated plates to break up gas bubbles and insure even distribution of the regeneration gas during its upward passage through the fluidized bed of catalyst in the vessel. The vessel is provided with two down-sloping catalyst withdrawal lines 6 and 7 near the bottom, and each of these lines is provided with catalyst flow control means such as valves 8 and 9. The distance between the level A of the fluidized bed in the vessel down to the level of valve 8 must be sufficient to provide a "hydrostatic" head of at least 10 p. s. i. g. and preferably at least 15 p. s. i. g. Vessel 1 is, therefore, relatively tall and narrow.

The apparatus requires at least three separate dust separators, such as the centrifugal separators 10, 11, 12 or their equivalents. In the particular apparatus shown, cyclone separators 10 and 11 are mounted within the vessel 1, whereas, cyclone separator 12 is mounted outside and above the vessel. While this particular arrangement of the separators is not essential, it is most practical and advantageous, and is to be recommended. The cyclone separators are provided with catalyst return lines (dip legs) 13, 14, and 15, respectively, which in the illustrated apparatus extend down into the fluidized catalyst bed. Baffles or equivalent means 16, 17 and 18 are provided below the end of the cyclone dip legs to prevent regeneration gas from entering the ends of the dip legs. Cyclone separator 11 is provided with an inlet port 19, in the disengaging space in the upper part of the vessel 1, above the catalyst bed level A.

The apparatus further comprises a long, narrow, sinuous, reaction tube which may be considered as comprising three sections 19, 19' and 19". As illustrated, the catalyst separator 10 is inserted in this reaction tube and catalyst separator 12 is connected to its discharge or exit end. The flow of the hydrocarbon vapors, introduced by feed line 20, is therefore through the section 19, through the cyclone separator 10, through the section 19', through the section 19", through the cyclone separator 12, and finally out via product line 21.

In operation, hot powdered catalyst is withdrawn from the fluidized bed in the regeneration vessel by line 6 at a rate controlled by valve 8. This catalyst is picked up and carried as a dilute suspension by the hydrocarbon vapors through the reaction tube to the separator 10. In separator 10 most of the suspended catalyst is separated and returned to the fluidized bed in the vessel 1 by dip leg 13. The vapors continue through section 19' into which a further quantity of hot regenerated catalyst is introduced via line 7 and valve 9. This second portion of catalyst is carried in suspension through the remaining part of the reaction tube to the separator 12. The suspended catalyst is separated in separator 12 and the separated catalyst is returned to the fluidized bed in vessel 1 by the dip leg 15.

The partially spent catalyst returned to the fluidized bed by the catalyst return lines 13 and 15 is regenerated during passage down through vessel 1 prior to being recirculated via lines 6 and 9. The regeneration gas introduced via line 22 and distributor 4 is withdrawn through separator 11 after passing up through the fluidized bed of catalyst.

The described process and apparatus may be applied for various hydrocarbon conversions including various reforming processes and catalytic refining processes as well as catalytic cracking and may be applied with any hydrocarbon oil or fraction thereof which is substantially completely vaporizable at normal or elevated pressures. Elevated temperatures and various pressure may be used and various diluent or auxiliary gases such as steam, hydrogen, or the like, may be applied as desired or needed.

Any catalyst which is suitable for the desired conversion may be used provided that it is a solid in a relatively finely divided state suitable for fluidization. The composition of the catalyst will depend in any case upon the desired conversion. Any of the so-called clay-type cracking catalysts, for example, may be used and they may be promoted with small amounts of such materials as Cr, Co, Mo, Pt, Ni, or the like, to improve the selectivity, regeneratability, or the like. The regeneration gas may be oxygen, air, steam, hydrogen, sulfur dioxide, or the like, depending upon the character of the catalyst and the particular conversion being carried out.

I claim as my invention:

1. In a catalytic conversion of a hydrocarbon oil with a finely divided solid catalyst, wherein the catalyst is continuously cycled through a hydrocarbon conversion zone and a separate catalyst regeneration zone, the improved method of operation which comprises maintaining a relatively deep bed of said catalyst in said regeneration zone, passing regeneration gas up through said relatively deep bed of catalyst at a rate to maintain said bed of catalyst in a fluidized condition, withdrawing regenerated catalyst from the bottom of said bed of fluidized catalyst at a controlled rate, suspending said withdrawn catalyst in hydrocarbon vapors to be converted to produce a dilute suspension and passing the said dilute suspension up through a long narrow reaction zone to a high point above the level of said fluidized bed, centrifugally separating most of the suspended catalyst from the vapors at said high point, passing the separated catalyst by gravity flow back to said fluidized bed near the top thereof, passing the partially converted hydrocarbon vapors down to a level below said fluidized bed, withdrawing a second stream of regenerated catalyst from the bottom of said fluidized bed, suspending the latter withdrawn catalyst in said partially converted hydrocarbon vapors to produce a dilute suspension and passing the resulting dilute suspension up through an extension of said long narrow reaction zone to a second high point above the level of said fluidized bed, centrifugally separating the suspended catalyst from the vapors at said latter high point, and passing the separated catalyst by gravity flow back to said fluidized bed near the top thereof.

2. The process according to claim 1 further characterized in that said second high point is above said first high point.

3. In the catalytic conversion of a hydrocarbon oil with a powdered catalyst wherein the catalyst is cycled through a hydrocarbon conversion zone and a separate catalyst regeneration zone, the improved method of operation which comprises passing hydrocarbon vapors to be converted through a long narrow reaction zone of substantially constant cross-section under conversion conditions, suspending regenerated catalyst in the said vapors near the inlet end of said reaction zone to produce a dilute suspension in said reaction zone, separating suspended catalysts from the vapors at an intermediate point along the length of said reaction zone and returning the separated catalyst by gravity flow back to the regeneration zone, suspending a second portion of regenerated catalysts in the vapors at a second intermediate point further along the length of said reaction zone to produce a dilute suspension of catalyst in said reaction zone, separating suspended catalyst from the hydrocarbon vapors at the outlet end of said reaction zone and returning the separated catalyst by gravity flow back to a regeneration zone.

4. Apparatus for the conversion of hydrocarbons with finely divided solid catalyst which comprises in combination, a vertically disposed cylindrical fluid catalyst regeneration vessel provided with means for injecting regeneration gas near the bottom, a first and second centrifugal dust separator mounted near the top of said vessel and provided with catalyst return lines near the bottom of said vessel said lines being arranged to discharge by gravity flow into said vessel, first and second catalyst withdrawal line provided with catalyst flow control means, a long narrow sinuous reaction tube having a reactant inlet and communicating seriatim with said first catalyst withdrawal line to the inlet of said first centrifugal separator from the gas outlet of said first centrifugal separator to said second withdrawal line, and from said second withdrawal line to the inlet of said second centrifugal separator, and a third centrifugal dust separator means near the top of said vessel and communicating with an exit line for regeneration gas from said regeneration vessel.

References Cited in the file of this patent

UNITED STATES PATENTS

| | | |
|---|---|---|
| 2,436,486 | Scheineman | Feb. 24, 1948 |
| 2,448,550 | Reed et al. | Sept. 7, 1948 |
| 2,461,958 | Bonnell | Feb. 15, 1949 |
| 2,462,891 | Noll | Mar. 1, 1949 |